US009429341B2

(12) United States Patent
Condie

(10) Patent No.: US 9,429,341 B2
(45) Date of Patent: *Aug. 30, 2016

(54) EXPANDABLE SHELTER HVAC SYSTEMS

(71) Applicant: Berg Companies, Inc., Spokane, WA (US)

(72) Inventor: Brent Condie, Worley, ID (US)

(73) Assignee: Berg Companies, Inc., Spokane, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/841,164

(22) Filed: Aug. 31, 2015

(65) Prior Publication Data
US 2015/0369520 A1 Dec. 24, 2015

Related U.S. Application Data

(62) Division of application No. 13/355,281, filed on Jan. 20, 2012, now Pat. No. 9,121,617.

(51) Int. Cl.
| | | |
|---|---|---|
| *F24F 1/02* | (2011.01) | |
| *F24F 13/02* | (2006.01) | |
| *F24J 3/08* | (2006.01) | |
| *E04H 1/00* | (2006.01) | |
| *E04B 1/344* | (2006.01) | |

(52) U.S. Cl.
CPC .............. *F24J 3/081* (2013.01); *E04H 1/005* (2013.01); *F24F 1/02* (2013.01); *F24F 13/0227* (2013.01); *E04B 1/3442* (2013.01)

(58) Field of Classification Search
CPC .. F24F 13/0227; F24F 1/02; H05K 7/20745; E04H 15/14; E04H 1/005; F24J 3/081; E04B 1/3442
See application file for complete search history.

(56) References Cited

U.S. PATENT DOCUMENTS

| | | |
|---|---|---|
| 4,033,078 A | 7/1977 | Prewer |
| 5,285,604 A | 2/1994 | Carlin |
| 5,596,844 A | 1/1997 | Kalinowski |
| 5,657,641 A * | 8/1997 | Cunningham ..... H05K 7/20681 361/691 |
| 5,706,846 A | 1/1998 | Sutton |
| 5,829,205 A | 11/1998 | Clark et al. |

(Continued)

OTHER PUBLICATIONS

Final Office Action for U.S. Appl. No. 13/355,281, mailed on May 7, 2014, Brent Condie, "Expandable Shelter HVAC Systems", 9 pages.

(Continued)

*Primary Examiner* — Joshua J Michener
*Assistant Examiner* — Alp Akbasli
(74) *Attorney, Agent, or Firm* — Lee & Hayes, PLLC

(57) ABSTRACT

Expandable shelters having a heating, ventilation, and air conditioning (HVAC) system arranged to receive outside air away from a mechanical compartment are disclosed. The expandable shelters may comprise an air inlet vent disposed in a front of the expandable shelter interconnected to an in-floor air duct arranged to draw outside air below an interior floor and exchange heat with the coolest area of the expandable shelter. By virtue of having an air inlet vent receive outside air from a location substantially away from the mechanical compartment and exchange heat with the coolest area of the expandable shelter, an environmental control unit (ECU), housed in the mechanical compartment, receives relatively cool outside air, keeping air temperatures inside the mechanical compartment below the upper operating limit of the ECU.

18 Claims, 5 Drawing Sheets

(56) References Cited

U.S. PATENT DOCUMENTS

| | | | |
|---|---|---|---|
| 5,936,550 A | 8/1999 | McCauley | |
| 6,158,175 A | 12/2000 | Carter | |
| 6,321,557 B1* | 11/2001 | Scrivener | F04B 39/0033 181/202 |
| 6,351,381 B1* | 2/2002 | Bilski | F28D 15/0266 165/104.33 |
| 6,431,628 B1 | 8/2002 | Bell, Jr. | |
| 6,672,955 B2 | 1/2004 | Charron | |
| 6,679,009 B2 | 1/2004 | Hotes | |
| 6,889,752 B2* | 5/2005 | Stoller | H05K 7/206 165/122 |
| 7,406,978 B2 | 8/2008 | Mintie et al. | |
| 7,486,512 B2 | 2/2009 | Campbell et al. | |
| 7,695,049 B2 | 4/2010 | Colborne | |
| 7,701,714 B2 | 4/2010 | Shabany | |
| 7,784,845 B2 | 8/2010 | Kim et al. | |
| 7,992,402 B2 | 8/2011 | VanGilder et al. | |
| 8,007,047 B2 | 8/2011 | Kennedy et al. | |
| 8,276,327 B1 | 10/2012 | Pellegrene et al. | |
| 8,331,086 B1* | 12/2012 | Meissner | H05K 7/20736 312/223.2 |
| 8,637,842 B2 | 1/2014 | Case, III et al. | |
| 8,842,420 B2 | 9/2014 | Driggers | |
| 9,004,995 B1* | 4/2015 | Derks | F24F 13/24 454/184 |
| 2003/0091363 A1* | 5/2003 | Hoffman | G03G 21/206 399/92 |
| 2004/0114326 A1* | 6/2004 | Dodgen | H05K 7/206 361/694 |
| 2004/0121718 A1 | 6/2004 | Grochowski | |
| 2006/0002084 A1 | 1/2006 | Wei | |
| 2006/0055193 A1 | 3/2006 | Colborne | |
| 2006/0199506 A1* | 9/2006 | Crocker | F24F 13/222 454/233 |
| 2008/0055848 A1 | 3/2008 | Hamburgen et al. | |
| 2008/0060372 A1* | 3/2008 | Hillis | H01L 23/467 62/259.2 |
| 2008/0196758 A1 | 8/2008 | McGuire | |
| 2009/0076658 A1* | 3/2009 | Kinnis | F24F 11/0001 700/277 |
| 2009/0321041 A1* | 12/2009 | Hammond | F25B 30/02 165/45 |
| 2010/0025008 A1* | 2/2010 | Walford | F24F 5/0046 165/45 |
| 2010/0070090 A1* | 3/2010 | Mirpourian | F24F 5/0085 700/278 |
| 2010/0112925 A1* | 5/2010 | Schmitt | H05K 7/20745 454/184 |
| 2010/0165565 A1 | 7/2010 | Hellriegal et al. | |
| 2010/0243228 A1 | 9/2010 | Price | |
| 2010/0307733 A1* | 12/2010 | Karamanos | F24F 11/006 165/254 |
| 2011/0099918 A1 | 5/2011 | Buchmann | |
| 2011/0207391 A1 | 8/2011 | Hamburgen et al. | |
| 2012/0033377 A1* | 2/2012 | Salpeter | H05K 7/1488 361/679.53 |
| 2012/0129442 A1 | 5/2012 | Wei | |

OTHER PUBLICATIONS

Office action for U.S. Appl. No. 13/355,281, mailed on Jun. 21, 2013, Condie, "Expandable Shelter HVAC Systems", 11 pages.

* cited by examiner

EXPANDABLE SHELTER HVAC SYSTEMS

This Application claims priority to U.S. patent application Ser. No. 13/355,281, filed Jan. 20, 2012, which is incorporated herein by reference.

BACKGROUND

Expandable shelters exist that have internal environmental control units (ECUs). For example, expandable shelters exist that have a mechanical room that houses an ECU for heating and/or cooling an interior of the expandable shelter. If airflow to the mechanical room is inadequate when equipment (i.e., ECUs, engines, and/or generators, etc.) housed in the mechanical room is in use, temperatures inside the mechanical room can exceed an upper operating limit of the ECU. Inadequate airflow to the ECU can cause the ECU to operate inefficiently and/or stop producing cool air altogether.

Accordingly, there remains a need in the art for improved airflow to an ECU housed in a mechanical room of an expandable shelter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This application describes expandable shelters having a heating, ventilation, and air conditioning (HVAC) system arranged to receive outside air from a location distant from a mechanical compartment of the expandable shelters. By virtue of having an HVAC system arranged to receive outside air from a location distant from a mechanical compartment, an environmental control unit (ECU), housed in the mechanical compartment, receives pure outside air and keeps air temperatures below the upper operating limit of the ECU.

In one example, the expandable shelters may comprise an air inlet vent disposed in an exterior of a front of the expandable shelter substantially away from the mechanical compartment arranged in a back of the expandable shelter.

In some examples, the inlet vent may be interconnected to an in-floor air duct arranged to draw the outside air below an interior floor of the expandable shelter to exchange heat with the interior floor and cooler air located below the expandable shelter.

In some examples, the expandable shelter may comprise an insulated air duct arranged in the mechanical compartment. The insulated air duct may be interconnected to the in-floor air duct and arranged to insulate the outside air from heat contained in the mechanical compartment while providing the cooler outside air to the ECU.

In some examples, the HVAC system described herein may include a booster fan to increase airflow to or through the ECU. For example, a booster fan may be fixed to the ECU arranged in the mechanical compartment.

While the air inlet vents are described in various embodiments herein as being located proximate to a bottom and a center of the front exterior of the expandable shelter, the air inlet vents may be located at other locations on the front exterior of the expandable shelter. For example, the air inlet vents may be located proximate to a bottom left side and/or a bottom right side of the front exterior of the expandable shelter. Alternatively, the air inlet vents may be located along all or substantially all of the bottom front exterior of the expandable shelter.

While the expandable shelters are described in various embodiments herein as having expandable sides between the front and back ends, the expandable shelters may have other expandable portions. For example, the expandable shelters may additionally or alternatively comprise an expandable top, front, and/or back, or any combination thereof.

Illustrative Expandable Shelter HVAC Systems

Figure 1:
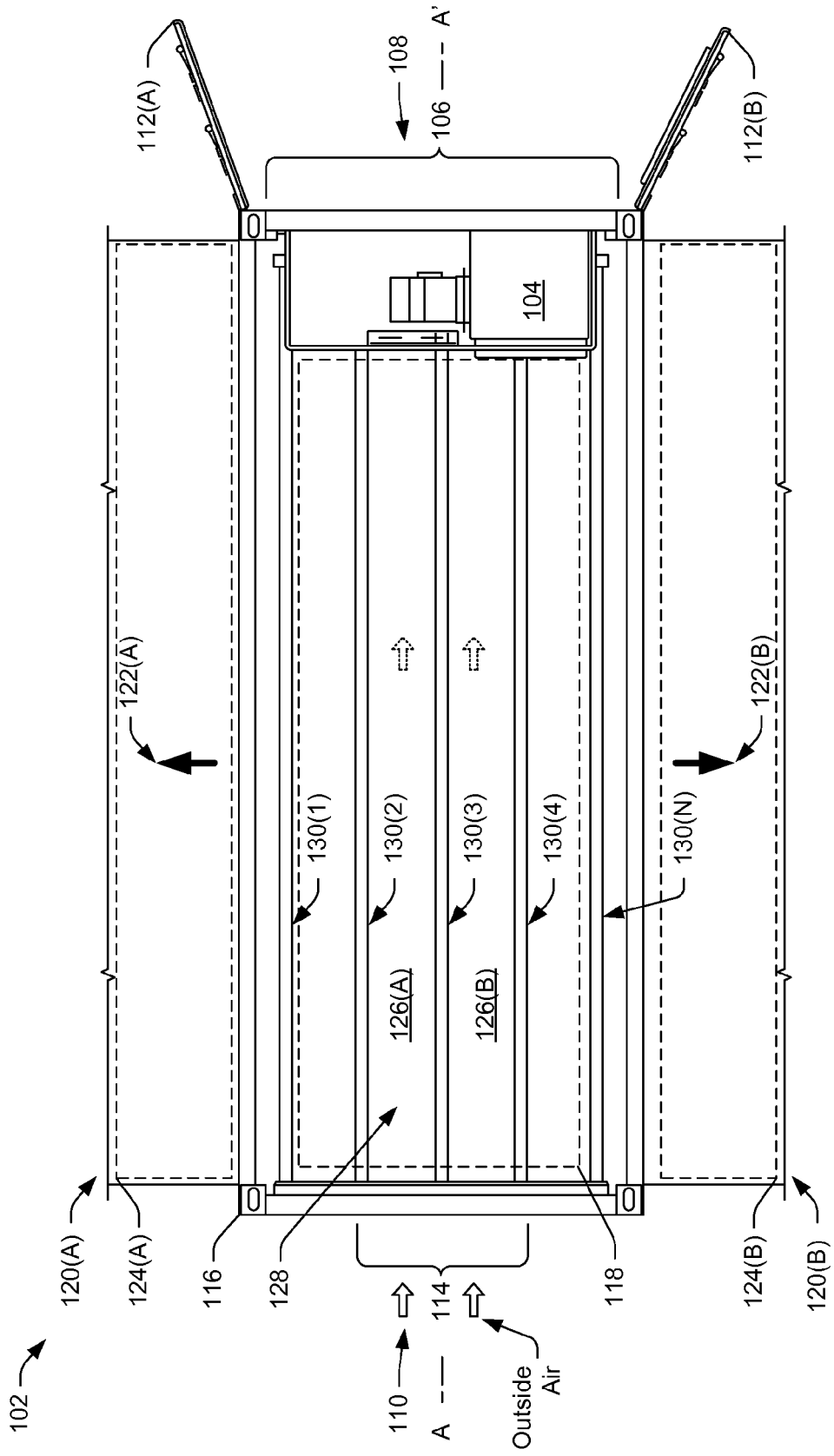
FIG. 1 depicts a top view of an illustrative expandable shelter having an environmental control unit (ECU) housed in a mechanical compartment at a back end of the expandable shelter and an air inlet vent disposed at an exterior of a front end of the expandable shelter.

FIG. 1 depicts a schematic top view of an illustrative expandable shelter 102 having an environmental control unit (ECU) 104, with a top of the shelter 102 removed to show internal components of the shelter. The ECU 104 may be housed in a mechanical compartment 106 at a back end 108, opposite a front end 110, of the expandable shelter 102. The mechanical compartment 106 may be accessed via two louvered doors 112(A) and 112(B). The louvered doors 112(A) and 112(B) may provide for ventilating the mechanical compartment 106. For example, the ECU 104 may exhaust hot air out at least one of the louvered doors 112(A) and 112(B).

The expandable shelter 102 may include an air inlet vent 114 disposed at an exterior of the front end 110 opposite to the mechanical compartment 106. The air inlet vent 114 may take in or receive ambient outside air at the front end 110 of the expandable shelter 102. Because the air inlet vent 114 is disposed on the front end 110, opposite to the back end 108 of the expandable shelter 102, this eliminates any chance of taking in hot air exhausted from the mechanical compartment 106. For example, because the air inlet vent 114 is disposed on the front end 110, the air inlet vent 114 does not take in hot exhaust from an engine/generator, an ECU (e.g., ECU 104), or any other heat generating equipment housed by the mechanical compartment 106 at the back end 108 of the expandable shelter 102.

The expandable shelter 102 may include an enclosure 116 defining an interior 118. The enclosure 116 may include sides 120(A) and 120(B), which may be displaceable in order to expand the shelter from a storage/shipping condition to a deployed/use position. For example, the sides 120(A) and 120(B) may be displaceable out and away from the enclosure 116, as indicated by direction arrows 122(A) and 122(B), to provide additional interior space 124(A) and 124(B) during use.

The expandable shelter 102 may be equipped to be used in various environments. For example, the expandable shelter 102 may be equipped for use in a commercial environment, industrial environment, military environment, or other environments. By way of example and not limitation, the expandable shelter 102 may be equipped to be used as a field office, field hospital, decontamination station, jail/brig, holding cell, isolation ward, command post, field morgue, communication center, camp, laboratory, and/or school. Further, the expandable shelter 102 may be equipped for use in most conditions. For example, the expandable shelter 102 may be equipped for use in desert conditions, arctic conditions, and/or marine conditions.

The expandable shelter 102 may be at least partially constructed from a standard shipping container (e.g., intermodal freight container) formed of metal (e.g., steel). For example, the enclosure 116 may be a standard shipping container modified to include the expandable sides 120(A) and 120(B), the mechanical compartment 106, electrical components, plumbing, insulation, etc. Because the expandable shelters 102 may be constructed from a standard shipping container, the expandable shelter 102 may have dimensions similar to that of standard shipping containers. For example, the expandable shelter 102 may have a length of at least about 20 feet (6 meters) and at most about 40 feet (12 meters), a width of at least about 8 feet (2 meters) and at most about 10 feet (3 meters), and a height of at least about 8 feet (2 meters) and at most about 10 feet (3 meters). However, in other examples, expandable shelters according to this disclosure may have other larger or smaller dimensions.

The expandable shelter 102 may include in-floor air ducts 126(A) and 126(B) interconnected to the air inlet vent 114. The in-floor air ducts 126(A) and 126(B) may be arranged to draw outside air from the front end 110 to the back end 108 along a bottom center (line A-A') of the enclosure 116. The in-floor air ducts 126(A) and 126(B) may be at least partially formed of an interior floor 128 of the expandable shelter 102 fixed to structural members 130(1) 130(2), 130(3), 130(4), and 130(N). For example, the in-floor air ducts 126(A) and 126(B) may be arranged below the floor 128 and between any of the structural members 130(1)-130(N). For example, the in-floor air ducts 126(A) and 126(B) may be arranged below the floor 128 and between the structural members which are located substantially proximate to the bottom center (line A-A') of the expandable shelter 102. While the in-floor air ducts 126(A) and 126(B) are illustrated as being arranged between the structural members 130(2), 130(3), and 130(4), in other embodiments the in-floor air duct 126(A) and 126(B) may additionally or alternatively be arranged between structural members 130(1) and 130(2), and/or 130(4) and 130(N), respectively, or any other combination of structural members 130(1)-130(N).

The floor 128 may comprise strips (e.g., tongue and groove planks) of material, a single sheet of material, or multiple sheets of material fixed to the structural members 130(1)-130(N). For example, the floor 128 may be formed of sheets of fiberglass, plastic, metal, wood, carbon fiber, or composites thereof (e.g., fiberglass reinforced plywood), and fixed to the structural members 130(1)-130(N). The floor 128 may be fixed to the structural members 130(1)-130(N) via a mechanical fastener (e.g., screws and/or bolts), a weld, an adhesive, or the like. The structural members 130(1)-130(N) may comprise beams (I-beams, wide-flange beams, C-channel beams, etc.), rails, tubes, pipes, etc. The structural members 130(1)-130(N) may be formed of any material suitable for carrying loads. For example, the structural members 130(1)-(N) may be formed of metal (e.g., steel), wood, reinforced concrete, composite, plastic, carbon fiber, etc. The structural members 130(1)-(N) may be fixed to the enclosure 116. For example, the structural members 130(1)-(N) may be mechanically fastened, welded, adhered, or the like, to a portion of the enclosure 116.

Because the in-floor air ducts 126(A) and 126(B) may be arranged to draw the outside air below the floor 128, the in-floor air ducts 126(A) and 126(B) are arranged to exchange heat with the floor 128 of the expandable shelter 102. Further, because the in-floor air ducts 126(A) and 126(B) may be arranged proximately along the bottom center (line A-A') of the expandable shelter 102, the in-floor air ducts 126(A) and 126(B) may be arranged in the coolest area of the expandable shelter 102. Thus, the in-floor air ducts 126(A) and 126(B) draw outside ambient air under the floor 128 through the coolest area of the expandable shelter 102, back to the mechanical compartment 106. As the in-floor air duct 126(A) and 126(B) draws outside ambient air under the floor 128 through the coolest area of the expandable shelter 102, the in-floor air ducts 126(A) and 126(B) may provide for exchanging heat with the floor 128 and/or the structural members 130(1)-130(N). For example, because the interior floor 128 and/or the structural members 130(1)-130(N) may be cooler than the outside ambient air, the outside ambient air may exchange heat with the floor 128 and/or the structural members 130(1)-130(N) as the in-floor air ducts 126(A) and 126(B) draw the outside air below the floor 128, proximate to the bottom center (line A-A'), back to the mechanical compartment 106. Further, the air under the expandable shelter 102 and close to the ground may also be cooler and may therefore cool the incoming air. For example, because the air under the expandable shelter 102 and close to the ground may be cooler than the outside ambient air, the outside ambient air may exchange heat with the structural members 130(1)-130(N) as the in-floor air ducts 126(A) and 126(B) draw the outside air below the floor 128 back to the mechanical compartment 106.

Figure 2:
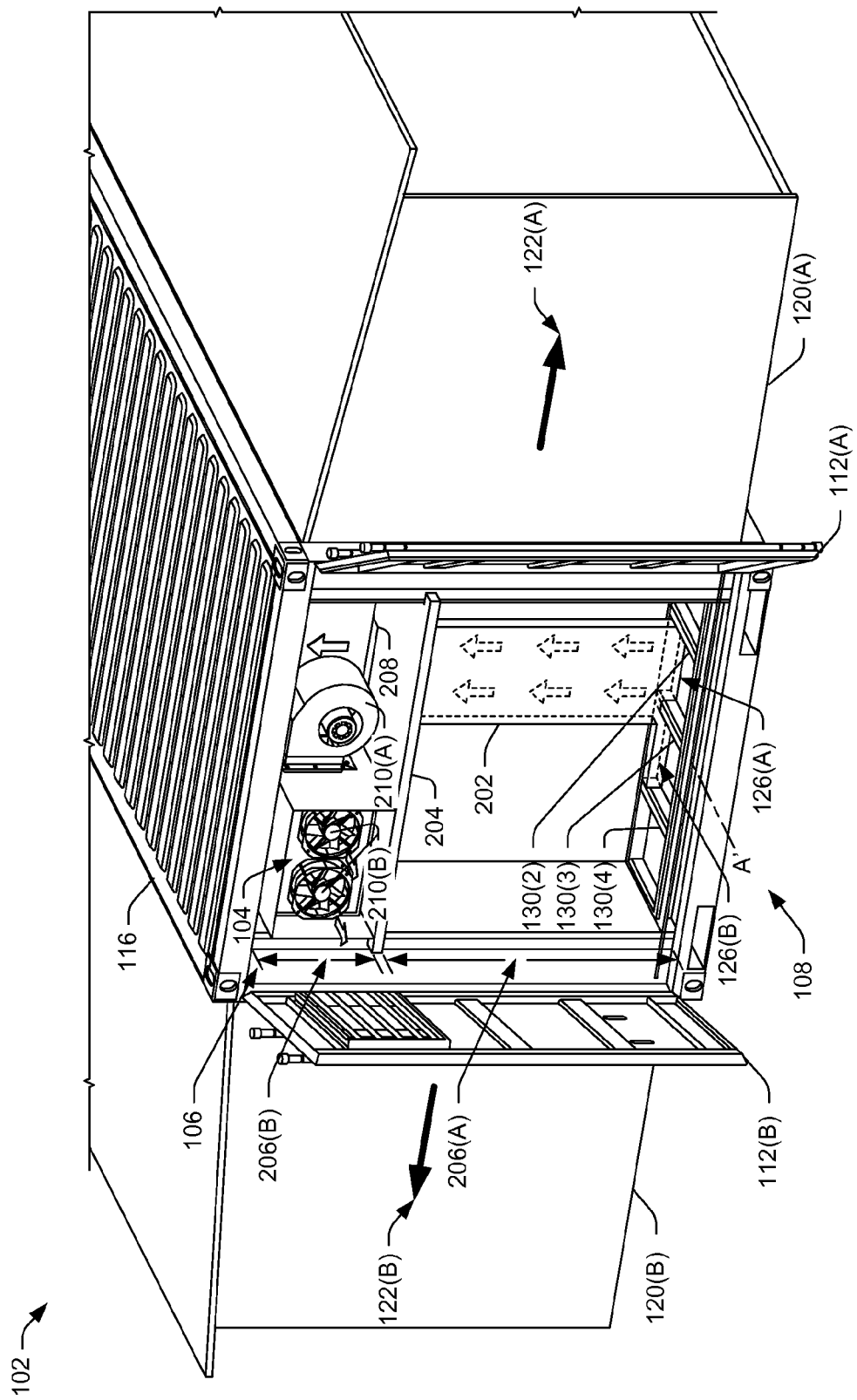
FIG. 2 depicts an illustrative view of the mechanical compartment at the back end of the expandable shelter illustrated in FIG. 1.

FIG. 2 is a perspective view of the mechanical compartment 106 at the back end 108 of the expandable shelter 102 illustrated in FIG. 1. As discussed above with respect to FIG. 1, the in-floor air ducts 126(A) and 126(B) may be arranged along the bottom center (line A-A') of the expandable shelter 102, in the coolest area of the expandable shelter 102. An insulated air duct 202 may be arranged vertically in the mechanical compartment 106 and interconnected to the in-floor air ducts 126(A) and 126(B). For example, the insulated air duct 202 may be arranged substantially perpendicular to the in-floor air ducts 126(A) and 126(B) and may receive outside air from the in-floor air ducts 126(A) and 126(B). The insulated air duct 202 may be arranged to insulate the outside air received from the in-floor air ducts 126(A) and 126(B). For example, the insulated air duct 202 may include an outer shell encasing an inner shell and an insulation material disposed between the outer and inner shells. The outer and inner shells may be formed of a metal (e.g., stainless steel), plastic, or composite.

The insulated air duct 202 may insulate the received outside air from heat contained in the mechanical compartment 106. For example, the insulated air duct 202 may insulate the received outside air from heat generated from an engine/generator, an ECU (e.g., ECU 104), or any other heat generating equipment housed by the mechanical compartment 106.

FIG. 2 illustrates the mechanical compartment 106 as including a shelf 204. The shelf 204 may partition the mechanical compartment 106 into two compartments 206(A) and 206(B). The ECU 104 may rest on the shelf 204 in the compartment 206(B) above the compartment 206(A). The compartment 206(A) may house at least an engine/generator and/or other equipment. Further, when the louvered doors 112(A) and 112(B) are closed, the ECU 104 is enclosed in the compartment 206(B) and the engine/generator and/or other equipment is enclosed in the compartment 206(A).

The insulated air duct 202 may extend through the compartment 206(A) and into the compartment 206(B). For example, the insulated air duct 202 may extend through the compartment 206(A) and terminate at a vent 208 in the shelf 204. The insulated air duct 202 may deliver the cool outside air into the compartment 206(B) to cool the ECU 104. For example, the insulated air duct 202 may deliver the outside air into the compartment 206(B) where a booster fans 210(A) and 210(B), fixed to the ECU 104, help the outside air across a condenser of the ECU 104. In addition to enhancing the airflow across the condenser of the ECU, the booster fans 210(A) and 210(B) may counteract a head loss due to restriction of the outside air flowing from the front end 110 of the expandable shelter 102 to the back end 108 of the expandable shelter 102. For example, booster fan 210(A) may be a large squirrel cage fan fixed to the ECU 104 that pulls the air from the in-floor air ducts 126(A) and 126(B), and up through the insulated air duct 202 and injects the air toward the condenser. The booster fan 210(B) may be an axial fan(s) fixed to the back of the condenser of the ECU 104 to counteract a restriction of air flow across the condenser. Generally, the booster fan 210(A) helps draw the outside air from the air inlet vent 114, along the in-floor air ducts 126(A) and 126(B), and up through the insulated air duct 202 to the compartment 206(B) enclosing the ECU 104, while the booster fan(s) 210(B) pull the air across the condenser and push the air out the louvered door 112(B).

Figure 3:
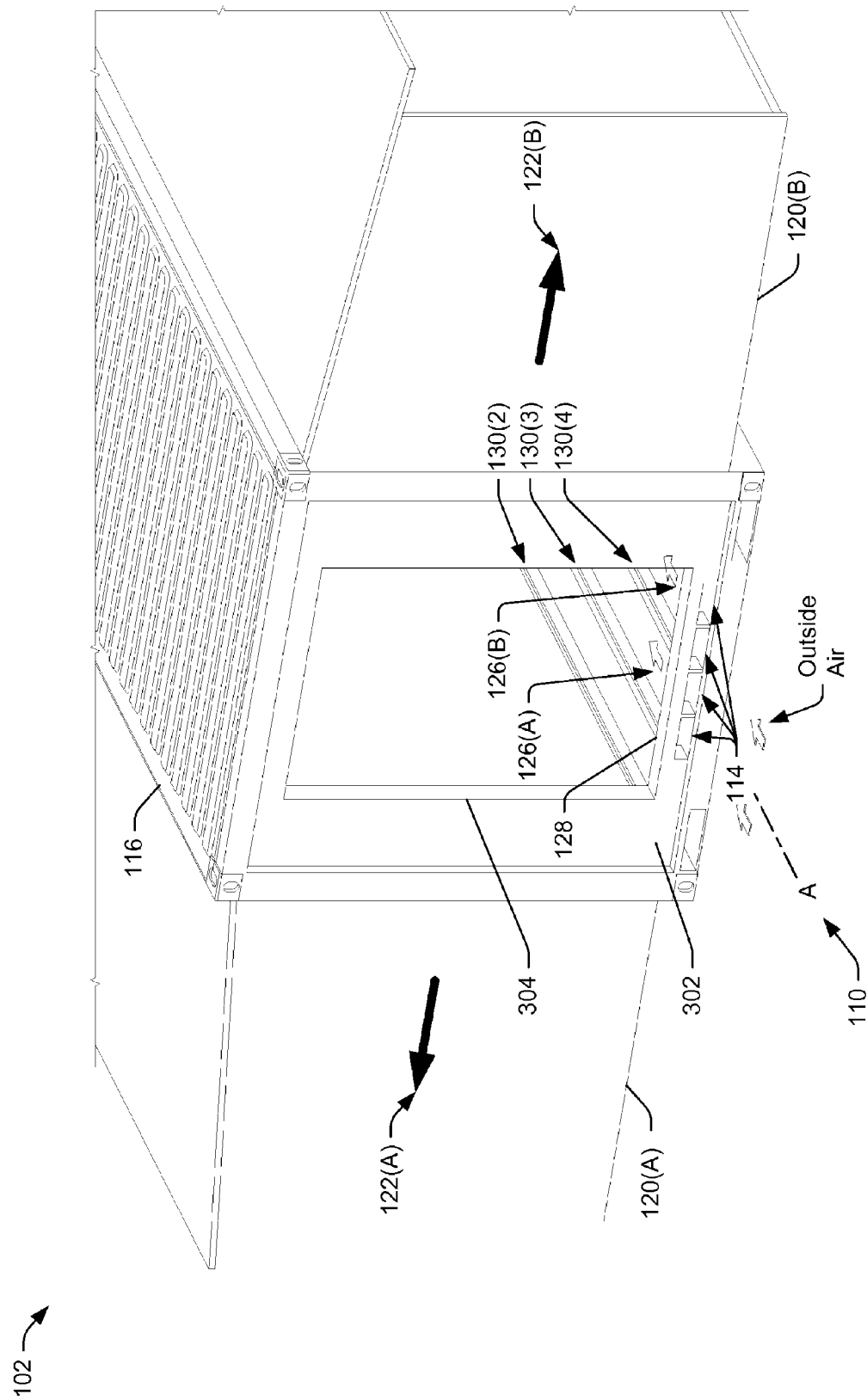
FIG. 3 depicts an illustrative view of the air inlet vent at the front end of the expandable shelter illustrated in FIG. 1.

FIG. 3 depicts an illustrative view of the air inlet vent 114 at the front end 110 of the expandable shelter 102 illustrated in FIG. 1. As discussed above with respect to FIG. 1, the air inlet vent 114 may be disposed at an exterior 302 of the front end 110 of the expandable shelter 102 to receive outside air substantially away from the mechanical compartment 106.

While FIG. 3 illustrates the air inlet vent 114 as being four separate openings disposed at the exterior 302, the air inlet vent 114 may be any number of openings disposed at the exterior 302. For example, the air inlet vent 114 may be one opening disposed at the exterior 302. The air inlet vent 114 may include an air filter to prevent debris from contaminating the heating, ventilation, air conditioning (HVAC) system of the expandable shelter 102 (i.e., the air inlet vent 114, in-floor air ducts 126(A) and 126(B), insulated air duct 202, compartment 206(B), booster fans 210(A) and 210(B), and ECU 104). The air filter may be a hog hair filter, a paper filter, foam filter, a cotton filter, wire mesh filter, etc. The air inlet vent 114 may include a screen to prevent animals from entering the HVAC system. Further, the air inlet vent 114 may include a snorkel. For example, the air inlet vent 114 may include a snorkel that removeably couples to the air inlet vent 114, raising the air inlet vent 114 up and away from the ground. For example, a snorkel may be removeably coupled to the inlet vent 114 to ensure the air inlet vent 114 remains open and free of any obstructions (e.g., dirt, mud, sand, foliage, water, or the like). The snorkel may be insulated and extend up against the exterior 302 of the front end 110 of the expandable shelter 102. For example, a snorkel may extend a distance of about ⅛, ¼, ⅓, ½, etc., the height of the expandable shelter 102.

A passageway 304 may be disposed at the exterior 302 of the front end 110 of the expandable shelter 102. The passageway 304 may provide access to the interior 118 of the enclosure 116, and/or access to the interiors 124(A) and 124(B) of the expandable sides 120(A) and 120(B). The passageway 304 may be arranged above the air inlet vent 114. For example, the passageway 304 may be arranged above the bottom center (line A-A') of the expandable shelter 102.

Objective Evidence

Figure 4A:
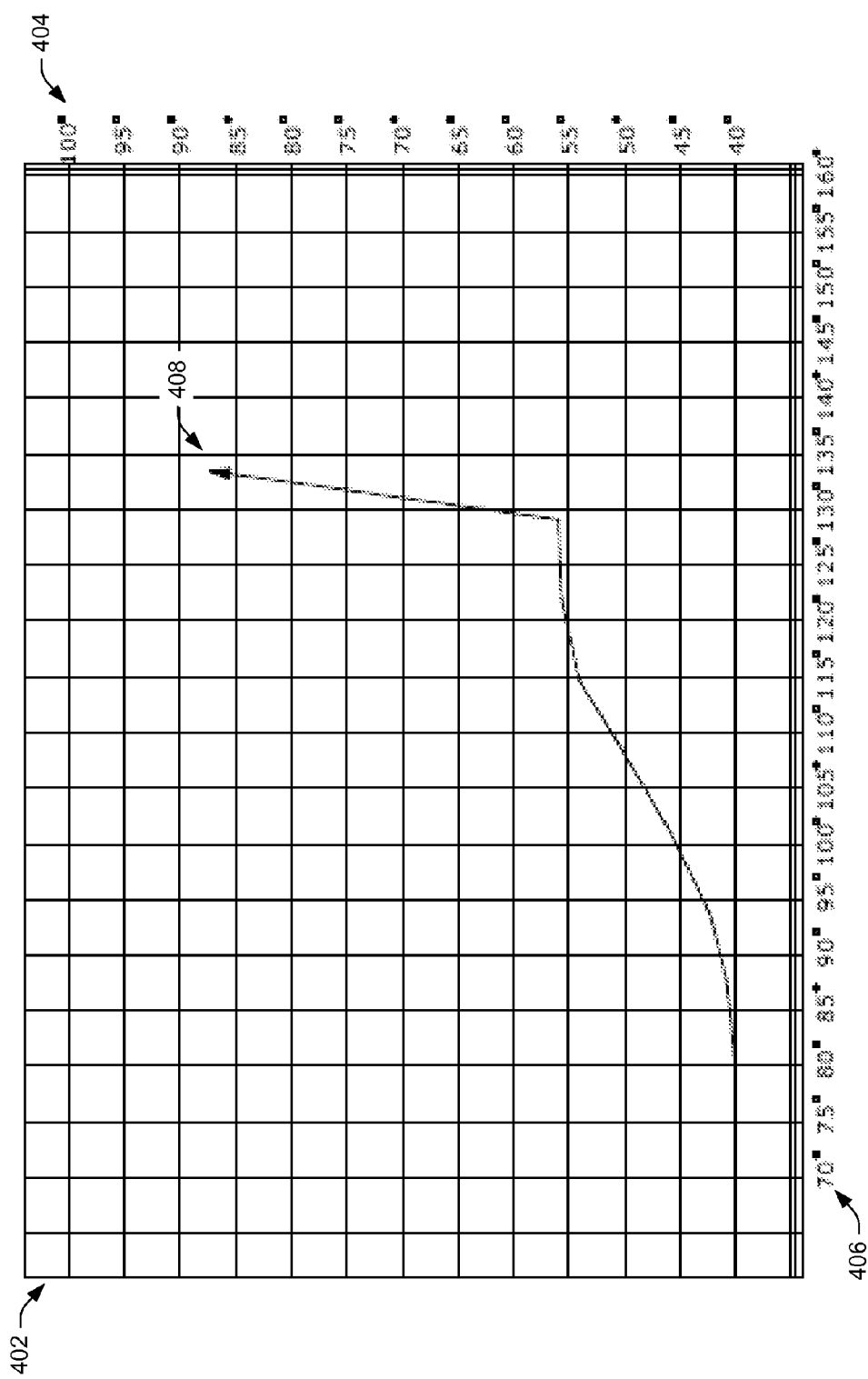
FIG. 4A is a line chart illustrating test results showing an ECU performance prior to implementing a heating ventilation air conditioning (HVAC) system of the expandable shelter illustrated in FIGS. 1-3.

FIG. 4A is a line chart 402 illustrating test results showing an ECU performance prior to implementing a heating ventilation air conditioning (HVAC) system of the expandable shelter illustrated in FIGS. 1-3. For example, FIG. 4A illustrates test results with an engine/generator and an environmental control unit (ECU) (e.g., ECU 104) running behind closed louvered doors (e.g., louvered doors 112(A) and 112(B)) in an expandable shelter, in which an air inlet for the ECU is disposed proximate to, and on a same side of the expandable shelter as, the exhaust of the ECU. That is, the chart 402 of FIG. 4A corresponds to an expandable shelter without an air inlet vent (e.g., air inlet vent 114) disposed at an exterior (e.g., exterior 302) of a front end (e.g., front end 110) of the expandable shelter. Further, FIG. 4A illustrates test results with an engine/generator and an ECU running behind closed louvered doors in an expandable shelter without an in-floor air duct (e.g., in-floor air ducts 126(A) and 126(B)) interconnected to the air inlet vent arranged to draw outside air from the front end a back end (e.g., back end 108) along a bottom center (e.g., bottom center (line A-A')) of the expandable shelter.

The line chart 402 includes a vertical axis 404 representing a cooling air temperature, in five degree increments, on an evaporator/exhaust side of the ECU, and a horizontal axis 406 representing ambient air temperature, in five degree increments, on the condenser/inlet side of the ECU.

The line chart 402 illustrates a trend line 408, which generally shows the ECU providing cooling air until the ambient air temperature on the condenser side is about 120 degrees. That is, the test data shows the ECU, housed in a mechanical compartment with poor airflow through the louvered doors. As a result, the ECU substantially stops cooling the interior of the expandable shelter when outside ambient temperatures reach or exceed 120 degrees Fahrenheit.

Figure 4B:
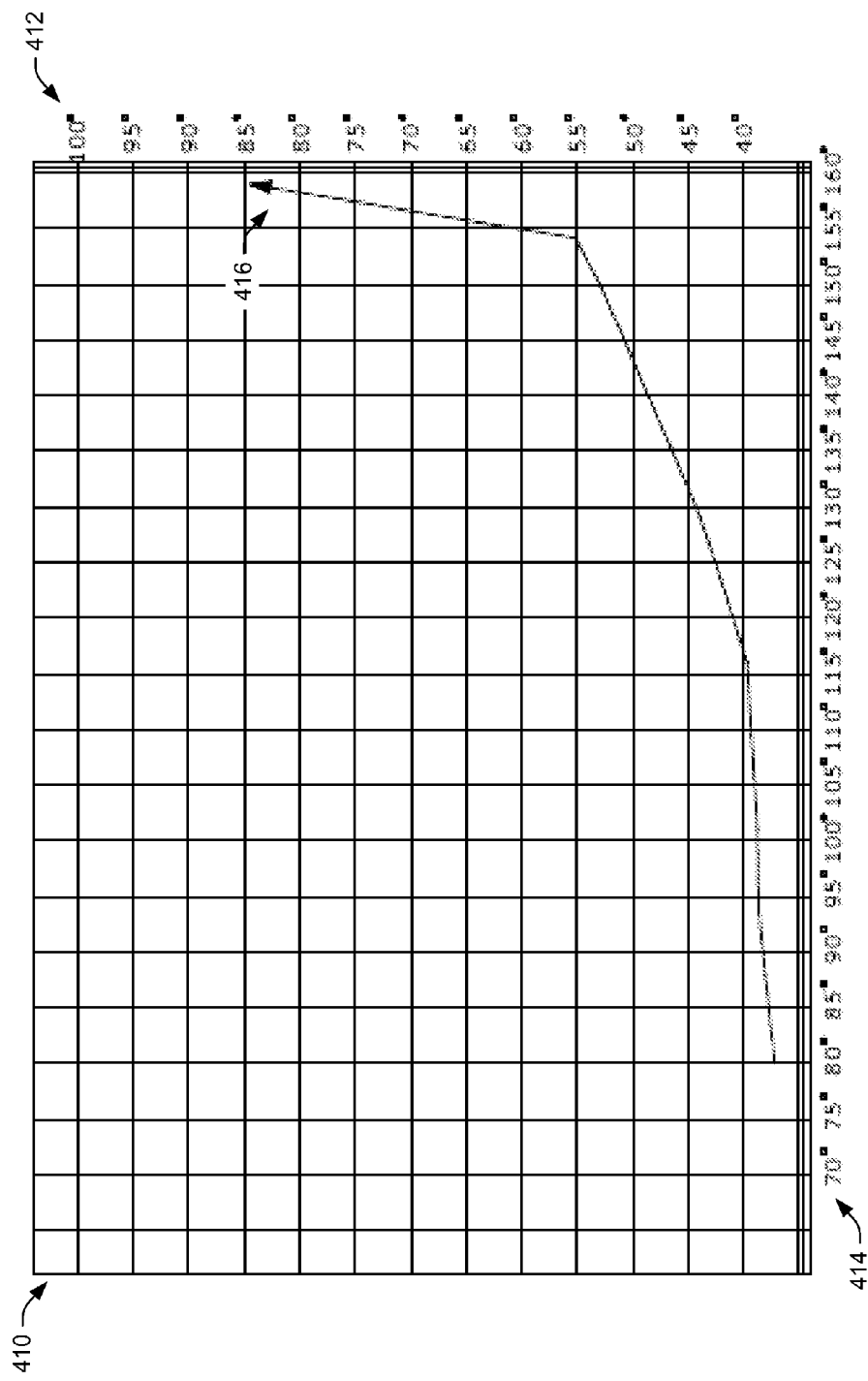
FIG. 4B is a line chart illustrating test results showing an increase in the ECU performance as a result of implementing the heating ventilation air conditioning (HVAC) system of the expandable shelter illustrated in FIGS. 1-3.

FIG. 4B is a line chart 410 illustrating test results showing an increase in the ECU performance subsequent to implementing the heating ventilation air conditioning (HVAC) system of the expandable shelter illustrated in FIGS. 1-3. For example, FIG. 4B illustrates test results with an engine/generator and the ECU running in the expandable shelter including the air inlet vent and the in-floor air ducts interconnected to the air inlet vent arranged to draw outside air from the front end the back end along the bottom center of the expandable shelter.

The line chart 410 includes a vertical axis 412 again representing a cooling air temperature, in five degree increments, on the evaporator/exhaust side of the ECU, and a horizontal axis 414 representing ambient air temperature, in five degree increments, on the condenser/inlet side of the ECU.

The line chart 410 illustrates a trend line 416, which generally shows the ECU providing cooling air until the ambient air temperature on the condenser side exceeds about 150 degrees. That is, the test data shows the ECU, housed in a mechanical compartment with a substantially improved airflow as compared to line chart 402. As a result, the ECU continues to cool the interior of the expandable shelter up to when the outside ambient temperature is about 150 degrees Fahrenheit.

Thus, lab tests have demonstrated an ECU, installed in the expandable shelter HVAC system described above with respect to FIGS. 1-3, continuing to provide cool air in substantially hotter conditions than were possible by ECUs installed in conventional shelter systems.

CONCLUSION

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. For example, in various embodiments, any of the structural features and/or methodological acts described herein may be rearranged, modified, or omitted entirely. For example, the shape, size, and configuration of the expandable shelter may be varied.

What is claimed is:

1. A heating, ventilation, and air conditioning (HVAC) system, the HVAC system arranged in an enclosure, the HVAC system comprising:
    a mechanical compartment arranged in a back of the enclosure and housing an environmental control unit (ECU) of the heating, ventilation, and air conditioning (HVAC) system;
    an air inlet vent of the HVAC system disposed proximate to the bottom of the enclosure and in an exterior of a front of the enclosure to receive outside air;
    an in-floor air duct of the HVAC system interconnected to the air inlet and arranged to draw the received outside air from the front to the back and along the bottom of the enclosure, and to exchange heat with an interior of the enclosure; and
    wherein the enclosure includes at least one displaceable side arranged between the ECU and the air inlet vent, the at least one displaceable side being displaceable in order to expand the enclosure from a shipping position to a use position.

2. The heating, ventilation, and air conditioning (HVAC) system of claim 1, wherein when the at least one displaceable side is in the shipping position, the at least one displaceable side is arranged in the interior of the enclosure above the in-floor air duct, and
    when the at least one displaceable side is in the use position, the at least one displaceable side is arranged out of the interior of the enclosure and away from the in-floor air duct.

3. The heating, ventilation, and air conditioning (HVAC) system of claim 1, further comprising:
    a floor fixed to structural members arranged from the front to the back and along the bottom of the enclosure, wherein the in-floor air duct is arranged below the floor and between the structural members to exchange heat with the floor in the interior of the enclosure.

4. The heating, ventilation, and air conditioning (HVAC) system of claim 1, wherein at least one of the structural members is formed of a metal beam and at least a portion of the floor is formed of a composite sheet.

5. The heating, ventilation, and air conditioning (HVAC) system of claim 1, further comprising an insulated air duct of the HVAC system interconnected to the in-floor air duct, the insulated air duct housed in the mechanical compartment and arranged to insulate the received outside air from heat contained in the mechanical compartment and to provide the received outside air to the ECU.

6. A heating, ventilation, and air conditioning (HVAC) system, the HVAC system comprising:
    in a shelter comprising an enclosure defining an interior and including a top, bottom, front, back, and two sides;
    a mechanical compartment arranged in the back of the enclosure and housing an environmental control unit (ECU) of a heating, ventilation, and air conditioning (HVAC) system;
    an air inlet vent of the HVAC system disposed proximate to the bottom of the enclosure and in an exterior of the front of the shelter to receive outside air; and
    an in-floor air duct of the HVAC system interconnected to the air inlet and arranged to draw the received outside air from the front to the back and along the bottom of the enclosure, and to exchange heat with the interior of the enclosure;
    wherein at least one of the sides being displaceable in order to expand the shelter from a shipping position to a use position;
    when the at least one displaceable side is in the shipping position, the at least one displaceable side is arranged in the interior of the enclosure above the in-floor air duct, and
    when the at least one displaceable side is in the use position, the at least one displaceable side is arranged out of the interior of the enclosure and away from the in-floor air duct.

7. The heating, ventilation, and air conditioning (HVAC) system of claim 6, further comprising:
    a floor fixed to structural members arranged from the front to the back and along the bottom of the enclosure, wherein the in-floor air duct is arranged below the floor and between the structural members to exchange heat with the floor in the interior of the enclosure.

8. The heating, ventilation, and air conditioning (HVAC) system of claim 6, wherein at least one of the structural members is formed of a metal beam and at least a portion of the floor is formed of a composite sheet.

9. The heating, ventilation, and air conditioning (HVAC) system of claim 6, further comprising an insulated air duct of the HVAC system interconnected to the in-floor air duct, the insulated air duct housed in the mechanical compartment and arranged to insulate the received outside air from heat contained in the mechanical compartment and to provide the received outside air to the ECU.

10. The heating, ventilation, and air conditioning (HVAC) system of claim 9, wherein the insulated air duct comprises an outer shell encasing an inner shell and an insulation material disposed between the outer and inner shells.

11. The heating, ventilation, and air conditioning (HVAC) system of claim 10, wherein the outer and inner shells are formed of steel.

12. A heating, ventilation, and air conditioning (HVAC) system for use in a shelter, comprising:
    an environmental control unit (ECU) housed in a mechanical compartment arranged in a back of the shelter opposite to a front of the shelter; and
    a duct system for supplying air to the ECU, the duct system comprising:
        an air inlet vent disposed in an exterior of the front of the shelter to receive outside air from a location substantially away from the mechanical compartment in the back of the shelter;
        an in-floor air duct arranged below a floor of an interior of the shelter, wherein the in-floor air duct is interconnected to the air inlet and arranged to draw the received outside air below the floor and to exchange heat with the interior of the shelter through the floor;

the shelter further comprising a displaceable side displaceable to expand the shelter from a shipping position to a use position;

wherein when the displaceable side is in the shipping position, the displaceable side is arranged in the interior of the shelter above the in-floor air duct arranged below the floor, and when the displaceable side is in the use position, the at least one displaceable side is arranged out of the interior of the shelter and away from the in-floor air duct arranged below the floor, and provides another interior in addition to the interior of the shelter.

13. The heating, ventilation, and air conditioning (HVAC) system for use in a shelter of claim 12, further comprising a booster fan fixed to the ECU to help draw the received outside air from the air inlet vent through the in-floor air duct to the ECU and to push the received outside air across a condenser of the ECU.

14. The heating, ventilation, and air conditioning (HVAC) system for use in a shelter of claim 12, further comprising an insulated air duct arranged in the mechanical compartment, wherein the insulated air duct is interconnected to the in-floor air duct and arranged to insulate the received outside air from heat contained in the mechanical compartment while providing the received outside air to the ECU.

15. The heating, ventilation, and air conditioning (HVAC) system for use in a shelter of claim 14, wherein the insulated air duct comprises an outer shell encasing an inner shell and an insulation material disposed between the outer and inner shells.

16. The heating, ventilation, and air conditioning (HVAC) system for use in a shelter of claim 14, wherein the outer and inner shells are formed of steel.

17. The heating, ventilation, and air conditioning (HVAC) system for use in a shelter of claim 12, further comprising an air filter arranged in the air inlet vent.

18. The heating, ventilation, and air conditioning (HVAC) system for use in a shelter of claim 17, wherein the air inlet is arranged substantially proximate to both a bottom and a center of the exterior of the front of the shelter.

* * * * *